United States Patent [19]

Avezou

[11] 4,387,627
[45] Jun. 14, 1983

[54] PISTON RING GROOVE REINFORCEMENT

[75] Inventor: Jean-Claude Avezou, Poitiers, France

[73] Assignee: Associated Engineering France, S.A., France

[21] Appl. No.: 170,176

[22] Filed: Jul. 18, 1980

[30] Foreign Application Priority Data

Jul. 19, 1979 [GB] United Kingdom ............... 7925234

[51] Int. Cl.³ .................................................. F16J 1/04
[52] U.S. Cl. ................................. 92/222; 29/156.5 R; 219/121 EB; 219/121 EF; 277/189.5
[58] Field of Search ............... 277/189.5; 92/172, 208, 92/222; 29/156.5 R; 219/121 EB, 121 EM, 121 EC, 121 ED, 121 EF, 121 EG

[56] References Cited

U.S. PATENT DOCUMENTS

| | | | |
|---|---|---|---|
| 1,790,230 | 1/1931 | Deputy | 29/156.5 R |
| 1,979,498 | 11/1934 | Short | 29/156.5 R |
| 2,262,074 | 11/1941 | Welty | 29/156.5 R |
| 2,833,668 | 5/1958 | Dailey et al. | 277/189.5 X |
| 2,919,965 | 1/1960 | Aberg | 277/189.5 X |
| 3,075,817 | 1/1963 | Mayer | 29/156.5 R |
| 3,118,712 | 1/1964 | Daub | 277/189.5 |
| 3,512,791 | 5/1970 | Daub | 277/189.5 |
| 3,545,772 | 12/1970 | Zollner | 29/156.5 R |
| 4,074,616 | 2/1978 | Gale et al. | 92/222 |
| 4,233,490 | 11/1980 | Shalai et al. | 92/222 |

FOREIGN PATENT DOCUMENTS 1441894 7/1976 United Kingdom .
1449162 9/1976 United Kingdom .
1524809 9/1978 United Kingdom .

*Primary Examiner*—George L. Walton
*Attorney, Agent, or Firm*—Leydig, Voit, Osann, Mayer & Holt, Ltd.

[57] ABSTRACT

A piston having a piston ring groove which is bounded on at least one side by a reinforcing element. The reinforcing element is provided with at least one recess into which material of the piston extends to establish a bond between the reinforcing element and the piston. The recess may be a channel of inclined U-shape or of keyhole shape and/or the reinforcing element can be made of a sintered material so that the piston material interlocks with pores forming recesses in the reinforcing element to establish the bond. The reinforcing element is secured in position by, for example, locally melting the material of the piston for example by an electron or laser beam and causing it to flow into the recess by gravity or otherwise.

6 Claims, 5 Drawing Figures

PISTON RING GROOVE REINFORCEMENT

BACKGROUND OF THE INVENTION

Field of the Invention

The present invention relates to pistons and to methods for their manufacture and in particular to the reinforcement of piston ring grooves.

Conventional pistons for internal combustion engines are provided with grooves for the accommodation of piston rings. However, the sides of the grooves may suffer wear and deformation due to the inertia effects of the piston rings as the piston is reciprocated during use. This deformation is a particular problem in aluminium pistons. In order to prevent deformation, reinforcing rings can be fixed to one or both sides of the piston ring groove, for example as described in British Patent Specification No. 1,441,984. The reinforcing rings have hitherto been fixed in position by chemical bonding or by welding.

BRIEF SUMMARY OF THE INVENTION

According to one aspect of the present invention, there is provided a piston having a piston ring groove bounded on at least one side by a reinforcing element, the reinforcing element having one or more recesses into which material of the piston extends and thereby secures the reinforcing element in position in the piston by the formation of a mechanical bond therebetween.

In a preferred embodiment the or each recess comprises a channel which is of re-entrant cross-section or outwardly inclined or otherwise undercut to ensure that forces applied laterally of the plane of the ring cannot sever the bond between the ring and the piston. For example the material of the piston projecting into the or each channel can form a ridge which is inclined towards the axis of the piston in a direction towards the groove. In addition, or alternatively, the channel may be provided with a necked portion.

In another preferred embodiment, the reinforcing ring is of a sintered material and it is bonded to the side of the groove by interlocking of the material of the piston with pores in the sintered reinforcing ring.

According to another aspect of the present invention, there is provided a method of making a piston having a piston ring groove bounded on at least one side by a reinforcing element, the method being characterised by locating a reinforcing element in a groove formed in the piston, locally melting the material of the piston adjacent the reinforcing element, for example by means of an electron beam or a laser beam, causing the molten piston material to penetrate one or more recesses in the reinforcing element and allowing the said molten material to solidify within the recesses so that a mechanical bond between the reinforcing element and the piston is established.

According to yet another aspect of the invention there is provided a method of making a piston having a piston ring groove bounded on at least one side by a reinforcing element characterised by casting the piston in a mould in which the or each reinforcing element has been located.

DETAILED DESCRIPTION OF THE PREFERRED EMBODIMENTS

Figure 1:
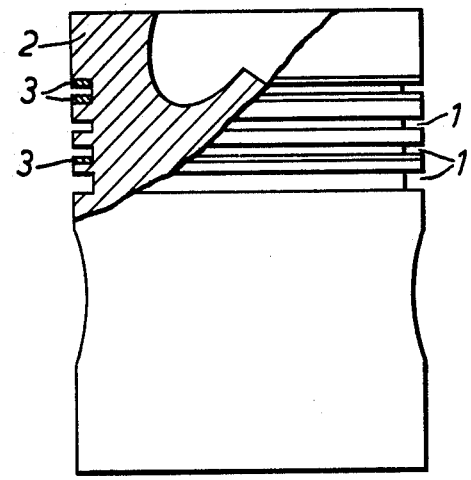
FIG. 1 is a side elevation of a piston, partly cut away.

A piston for a diesel engine is provided with a number of piston ring grooves 1 (FIG. 1) formed in the piston body 2 in order to accommodate piston rings (not shown). The piston body 2 is preferably formed of an aluminium alloy, for example LO-Ex or hypereutectic alloy.

Figure 2:
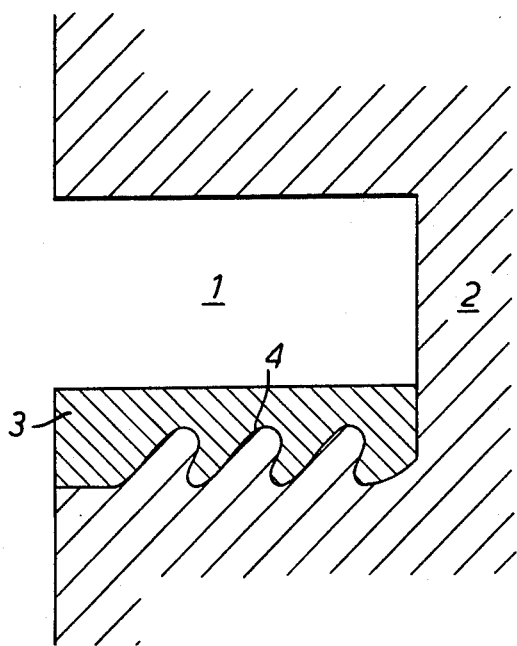
FIG. 2 is a section through a portion of a piston showing a reinforced piston ring groove.

A reinforcing ring 3 is located to form one side surface of the piston ring groove 1. In one embodiment (FIG. 2) the surface of the reinforcing ring 3 remote from groove 1 is provided with a plurality of outwardly inclined channels 4.

The reinforcing ring 3 is secured in the position shown in accordance with one method of manufacture, by cutting a groove 1 in the piston at least large enough to accommodate the ring 3 and by melting the material of the piston body 2 adjacent the reinforcing ring 3 and causing it to flow into the channels 4 by gravity or otherwise. This local melting of the material of the piston body 2 can be effected by means of an electron beam or a laser beam, both of which provide a narrow high-energy beam of the required intensity at the interface between the ring 3 and the piston. The material of the piston body 2 is then allowed to solidify in the channels 4 so that the reinforcing ring 3 is secured to the piston body by mechanical bonding. If the space remaining within the groove 1 is undersize in relation to the piston ring it is to contain, the groove will be enlarged by machining, and this may involve machining away part of the reinforcing ring.

Figure 3:
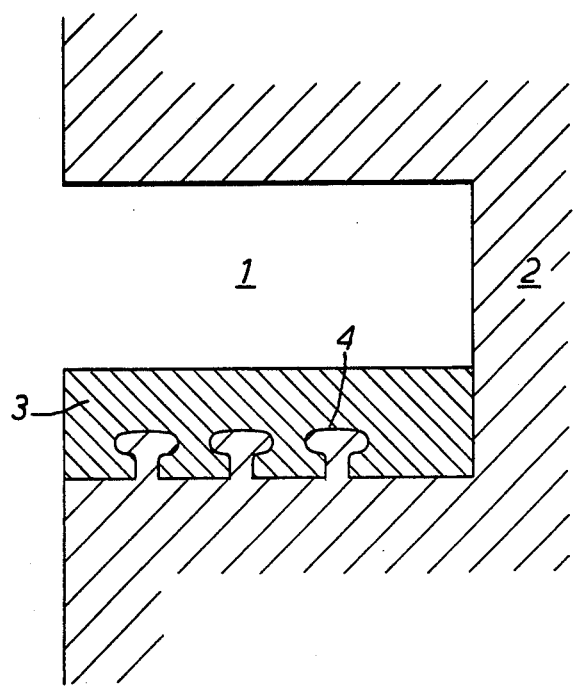
FIG. 3 is a section through a further embodiment of the piston ring groove.

Various profiles can be used for the channels 4, but preferably at least one portion of the channel is re-entrant or outwardly inclined or otherwise undercut. Therefore the reinforcing ring 3 is retained mechanically in the piston ring groove against lateral forces which might sever the bond between the piston material and the reinforcing ring. In another embodiment (FIG. 3) the channels 3 are key-hole shaped in cross section.

The reinforcing ring 3 is preferably made of austenitic cast iron. Examples of suitable cast irons include the following:

EXAMPLE 1

| CI 6 | Composition | |
|---|---|---|
| | Element | wt % |
| | Total C | 2.5–3 |
| | Si | 2.2 max |
| | Mn | 0.7–1.2 |
| | S | 0.1 max |
| | P | 0.8 max |
| | Ni | 13–17 |
| | Cr | 1.5 min |
| | Cu | 6–8 |
| | Fe | remainder |

EXAMPLE 2

| CI 40 | Composition | |
|---|---|---|
| | Element | wt % |
| Total | C | 2.8–3.3 |
| | Si | 2.8–3.5 |
| | Mn | 5.5–9 |
| | S | 0.025 max |
| | P | 0.5 max |
| | Ni | 2–6 |
| | Cr | 0.3 max |
| | Cu | 5 max |
| | Fe | remainder |

Other suitable materials include steel, wear-resistant aluminium alloys, or a sprayed wear-resistant material for example that disclosed in Wellworthy British Patent Specification No. 1,449,162.

A further possibility is for the reinforcing ring 3 to be made of a sintered material for example, as described and claimed in British Patent Specification No. 1,441,984 and in British Patent Specification No. 1,524,809 or other porous material. A ring of this type has the advantage that material of the piston body 2 can penetrate the pores of the ring 3 and this provide a strong mechanical bond. If the reinforcing ring 3 is made of a sintered material, it may be possible for the channels in the reinforcing ring to be of approximately rectangular section or even for the channels to be eliminated so that the surface of the reinforcing ring is flat since the penetration of the material of the piston body into the pores of the sintered ring may provide sufficient mechanical retention to hold the ring 3 in place.

Reinforcing rings may be secured to both sides of the piston ring groove. Each ring may be in two or more pieces to assist assembly. Alternatively a one piece reinforcing ring may be used and an aluminium ring welded to the top of the piston to form the piston ring groove.

Figure 4:
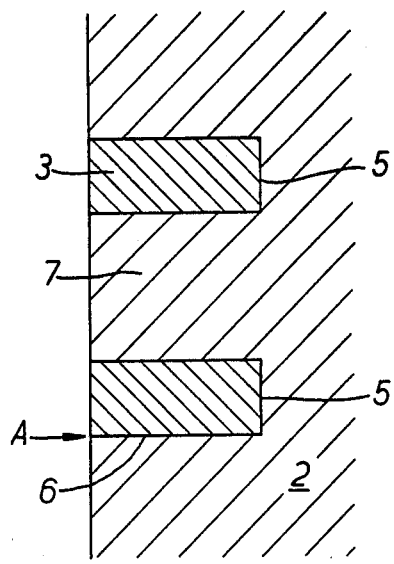
FIG. 4 is a section through a portion of a piston at a stage during one method of manufacture.

In an alternative method of manufacture the piston can be made by forming one or more small grooves 5 in a cylinder body (see FIG. 4), each groove 5 being of a size just sufficient to accommodate a reinforcing ring 3. A mechanical bond, as described above, is then established between the piston body 2 and that surface of the reinforcing ring 3 which will be remote from the piston ring groove by melting the material of the piston body 2 at the interface 6. This melting can be effected by, for example, an electron beam aimed in the direction A.

Once the reinforcing ring 3 is secured in position, the piston ring groove 1 can be formed by machining. In the case illustrated in FIG. 4 the portion 7 of the piston body 2 is machined away to leave a groove (like groove 1 of FIG. 1) which has a reinforcing ring 3 on its upper and lower surface. Preferably the distance between the two reinforcing rings 3 will be such that a portion of each reinforcing ring 3 adjacent the groove will also be machined away to ensure an accurately dimensioned piston ring groove.

Figure 5:
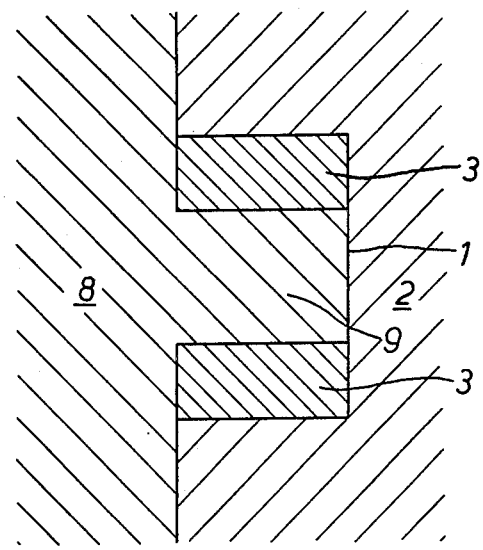
FIG. 5 is a section through a portion of a piston at a stage during an alternative method of manufacture.

In a third method of performing the invention, a piston body 2 is formed by casting in a mould 8 (FIG. 5) such as a sand mould, in which one or more reinforcing rings 3 have been located, preferably supported by the opposite sides of a rib 9 projecting inwardly from the mould wall. During subsequent casting of the piston, molten metal of the piston body will flow into contact with the reinforcing ring 3 and a mechanical bond as described above will be established therebetween.

After cooling and solidification, the piston body 2, with the reinforcing rings 3 embedded therein, is removed from the mould 8. The rings 3 will preferably be so spaced apart as to require some machining of the adjacent surfaces of the rings to leave an accurately dimensioned piston ring groove.

It has hitherto been a problem that intermetallic compounds form at the joint face between reinforcing rings 3 and the piston body 2. These intermetallic compounds tend to weaken the bond between the reinforcing element and the piston body. However, it is believed that when the metal of the piston 2 is melted as in the present case, by means of, for example, a laser beam, the intermetallic compounds may diffuse into the body of the piston thus removing them from the surface. This should result in a stronger bond.

Once in position, the reinforcing ring is reliably held in the piston ring groove and therefore reduces wear on the sides of piston ring groove due to operation of the piston.

I claim:

1. A piston comprising
   a piston body of a material selected from the group of aluminium and aluminium alloys,
   a plurality of piston ring grooves formed in the piston body and having substantially uniform depth around the piston,
   two side surfaces included in each piston ring groove,
   an annular reinforcing ring received within one of said piston ring grooves and having a substantially uniform radial width equal to the radial depth of the piston ring groove,
   a first surface included on the reinforcing ring and forming one side surface only of the piston ring groove,
   a second surface included on the reinforcing ring and forming an interface with one piston ring groove side surface, and
   means on the piston ring groove surface and means on the reinforcing ring surface defining a mechanical interlock therebetween at said interface including material of said piston penetrating recesses in said ring whereby the reinforcing ring is retained in the piston ring groove by a mechanical bond.

2. A piston according to claim 1, wherein the reinforcing element is of a porous material and the means on the reinforcing ring surface comprise pores in the surface of the reinforcing element and the means on the groove surface comprise piston material penetrating into said pores.

3. A piston according to claim 2, wherein the reinforcing element is of a sintered material to provide said pores and the material of the piston penetrates into said pores to interlock with the sintered material.

4. A piston according to claim 1, wherein the means on the reinforcing ring surface includes a channel formed in the reinforcing ring.

5. A piston according to claim 4, wherein the means on the groove surface comprises a ridge projecting into said channel, said ridge being inclined towards the axis of the piston in a direction towards the groove.

6. A piston according to claim 4, wherein said channel is formed with a neck portion, and is of key-hole shape.

* * * * *